United States Patent [19]

Tomoda et al.

[11] Patent Number: 4,491,536
[45] Date of Patent: Jan. 1, 1985

[54] CARBON FIBER-CONTAINING FLUOROELASTOMER COMPOSITION

[75] Inventors: Masayasu Tomoda, Shiga; Shoji Kawachi, Nishinomiya; Hiroyuki Tanaka, Settsu, all of Japan

[73] Assignee: Daikin Kogyo Co., Ltd., Osaka, Japan

[21] Appl. No.: 536,964

[22] Filed: Sep. 29, 1983

[30] Foreign Application Priority Data

Sep. 29, 1982 [JP] Japan .................................. 57-171442
Oct. 7, 1982 [JP] Japan .................................. 57-177119

[51] Int. Cl.$^3$ ............................................. H01B 1/06
[52] U.S. Cl. ................................... 252/511; 252/506; 524/495; 524/496

[58] Field of Search ................... 525/326.3; 524/495, 524/496, 401, 500, 520; 252/506, 511, 502

[56] References Cited

U.S. PATENT DOCUMENTS 4,243,770  1/1981  Tatemoto et al. ............... 525/326.3
4,248,763  2/1981  Yoshimura et al. ................ 524/496
4,265,789  5/1981  Christopherson ................... 252/511

Primary Examiner—Josephine L. Barr
Attorney, Agent, or Firm—Birch, Stewart, Kolasch & Birch

[57] ABSTRACT

A fluoroelastomer composition comprising a cross-linkable fluoroelastomer and/or a thermoplastic fluoroelastomer and carbon fiber having a low volume resistivity of $10^{-1}$ to $10^{13}$ ohm.cm.

11 Claims, No Drawings

CARBON FIBER-CONTAINING FLUOROELASTOMER COMPOSITION

The present invention relates to a carbon fiber-containing fluoroelastomer composition. More particularly, it relates to a carbon fiber-containing fluoroelastomer composition comprising a cross-linkable fluoroelastomer and/or a thermoplastic fluoroelastomer.

Carbon black is usually compounded in a fluoroelastomer composition as a filler. However, volume resistivity of the fluoroelastomer containing a usual amount of the carbon black is as large as about $10^{13}$ ohm.cm. Therefore, in order to impart electrical conductivity to the fluoroelastomer composition to be used in a field in which electrical conductivity is required, the carbon black is compounded in such an amount as to deteriorate the rubber elasticity of the composition. Instead of the carbon black, an inorganic powdery material such as graphite, electrically conductive carbon black, powdery or fibrous metal, inorganic powder, such as metal or its oxide the surface of which is treated to impart electric conductivity, may be compounded in the fluoroelastomer composition in order to make the fluoroelastomer composition electrically conductive.

When the electrically conductive carbon black is used, its structure is broken under shear stress excerted by an extruder, a kneader or mixing rolls during the processing of the composition, so that enough electric conductivity is not imparted to the composition. If the electrically conductive carbon black is compounded so much as to make the composition electrically conductive, the molded product from the composition is too hard and the rubber elesticity is deteriorated, although the electrical conductivity is imparted. In addition, since processability of the fluoroelastomer and that of the carbon black are different, roll mixing takes longer time, and heat build-up is so large that the stability of the composition deteriorates. Further, the carbon black inhibits cross-linking of the composition.

When the powdery or fibrous metal or the metal or its oxide, the surface of which is treated to impart electric conductivity, is used they must be also added in a large amount to impart the necessary electrical conductivity to the composition, but only a composition having a large specific gravity and lacking the rubber elesticity is obtained.

As a result of extensive study, it has now been found that when carbon fiber is compounded in a fluoroelastomer composition, it is possible to impart the desired electric conductivity to the composition without deteriorating the other properties of the composition.

According to the present invention, there is provided a fluoroelastomer composition comprising a fluoroelastomer and carbon fiber.

The term "fluoroelastomer" herein used is intended to mean the "cross-linkable fluoroelastomer", the "thermoplastic fluoroelastomer" or a mixture thereof.

The cross-linkable fluoroelastomer may be any one of a conventional fluoroelastomer which can be cross-linked by the use of an organic peroxide compound, a polyamine compound or a polyol compound and a cross-linking accelerator according to a conventional method.

Specific examples of the cross-linkable fluoroelastomer are vinylidene fluoride/hexafluoropropylene copolymers, vinylidene fluoride/tetrafluoroethylene/hexafluoropropylene terpolymers, vinylidene fluoride/chlorotrifluoroethylene copolymers, tetrafluoroethylene/propylene copolymers, hexafluoropropylene/ethylene copolymers, perfluoroalkyl vinyl ether (including those having plural ether linkages)/olefin (e.g. tetrafluoroethylene, ethylene, etc.) copolymers, fluorosilicone elastomers, fluorophosphazene elastomers, etc. Some of these fluoroelastomers may bear linked iodine or bromine atoms, which improve cross-linkability of the fluoroelastomers (cf. Japanese Patent Publication (unexamined) Nos. 125491/1978 and 130781/1982 and Japanese Patent Publication No. 4115/1978).

In the cross-linkable fluoroelastomer, a liquid fluoroelastomer having a number average molecular weight of 500 to 20,000 may be added in order to adjust the hardness and/or elongation of the composition.

As the organic peroxide compound, any one that has reactivity with peroxy and polymer radicals may be used. Specific examples of the peroxide compound are triallyl cyanurate, triallyl isocyanurate, triacryl formal, triallyl trimellitate, N,N'-m-phenylene bismaleimide, dipropargyl terephthalate, diallyl phthalate, tetraallyl terephthalamide, triallyl phosphate, hexafluorotriallyl isocyanurate, N-methyltetrafluorodiallyl isocyanurate, etc. The amount of the organic peroxide is from 0.1 to 10 parts by weight on the basis of 100 parts by weight of the cross-linkable fluoroelastomer.

When the cross-linkable fluoroelastomer is cross-linked by the use of the peroxide compound, a polyfunctional compound which bears at least one functional group selected from the group consisting of $CH_2=CH-$, $CH_2=CH-CH_2-$, $CF_2=CF-$ may be added to the composition. Preferred polyfunctional compounds are dialkyl compounds. The amount of the polyfunctional compound is from 0.5 to 10 parts by weight on the basis of 100 parts by weight of the cross-linkable fluoroelastomer.

The term "thermoplastic fluoroelastomer" herein used is intended to mean a fluoroelastomer which shows elasticity like a cross-linked elastomer at a comparatively low temperature and shows plastic flow when heated.

A preferred thermoplastic fluoroelastomer comprises a polymeric chain comprising at least one elastomeric polymer segment and at least one non-elastomeric polymer segment, at least one of these segments being a fluorine-containing polymer segment. Preferably, the weight ratio of the elastomeric polymer segment and the non-elastomeric polymer segment is from 40:60 to 95:5.

A more preferred thermoplastic fluoroelastomer comprises a polymeric chain comprising two or three polymer segments, at least one iodine atom liberated from an iodinated compound and bonded to a terminal carbon atom of the polymeric chain and a fragment of the iodinated compound excluding the liberated iodine atom therefrom;

one polymer segment (when the polymeric chain comprises two polymer segments) or one or two polymer segments (when the polymer chain comprises three polymer segments) being elastomeric polymer segment(s) having a molecular weight of from 30,000 to 1,200,000 selected from the group consisting of (1) a vinylidene fluoride/hexafluoropropylene/tetrafluoroethylene or vinylidene fluoride/pentafluoropropylene/tentrafluoroethylene polymer in a molar ratio of 45-90:5-50:0-35 and (2) a perfluoro($C_1-C_3$-alkyl vinyl ether) (including those having plural ether linkages)/tetrafluoroethylene/vinylidene fluoride polymer in a molar ratio of 15–75:0–85:0–85, other polymer segment(s) being a non-elastomeric polymer having a molecular weight of from 3,000 to 400,000 selected from the group consisting of (3) a vinylidene fluoride/tetrafluoroethylene polymer in a molar ratio of 0:100 to 100:0 and (4) a ethylene/tetrafluoroethylene/hexafluoropropylene, 3,3,3-trifluoropropylene-1,2-trifluoromethyl-3,3,3-trifluoropropylene-1 or perfluoro($C_1$–$C_3$-alkyl vinyl ether) (including those having plural ether linkages) polymer in a molar ratio of 40–60:60–40:0–30, and the weight ratio of the elastomeric polymer segment and the non-elastomeric polymer segment being from 40:60 to 95:5.

The above described preferred thermoplastic iodine-containing fluoroelastomer is disclosed in Japanese Patent Publication No. 4728/1983 and U.S. Pat. No. 4,158,678, the disclosure of which is hereby incorporated by reference.

The iodine-containing thermoplastic fluoroelastomer polymeric chain comprises at least two polymer segments, at least one iodine atom which is liberated from the iodinated compound and bonded to one terminal carbon atom of the polymeric chain and the fragment of the iodinated compound excluding the liberated iodine atom therefrom. The thermoplastic iodine-containing fluoroelastomer may be represented by the formula:

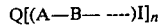

$$Q[(A-B-\text{----})I]_n$$

wherein Q is the fragment of the iodinated compound excluding the liberated iodine atom therefrom, A, B, etc. are each an polymer segment provided that at least one of them is a fluorine-containing polymer segment, I is an iodine atom liberated from the iodinated compound, and n is the valence of the fragment Q. In the thermoplastic fluoroelastomer, the two polymer segments adjacent each other consist of different monomers or of the same monomers in different proportions. Preferably, each polymer segment has a molecular weight of at least 3,000 and at least one segment has a molecular weight of at least 30,000, so that the telomeric molecular weight range is exluded. Further, when the iodinated compound has a polymerizable double bond in the molecule, the fragment of the iodinated compound excluding the liberated iodine atom therefrom may have such a substituent as is derived from the monomer constituting the polymer segment or the iodinated compound itself. The thermoplastic iodine-containing fluoroelastomer may contain 0.001 to 10% by weight of an iodine atom. The iodine atom bonded to the thermoplastic fluoroelastomer can be eliminated by an appropriate treatment or substituted by another atom or substituent. Such an iodine atom-eliminated or substituted fluoroelastomer is also used in the present invention.

Although the thermoplastic fluoroelastomer can be hardened by cooling after molded without the addition of any cross-linking agent, according to final use of the composition, a cross-linking agent such as the organic peroxide compound, the polyol compound and the cross-linking accelerator and the polyamine compound as used in the case of the cross-linkable fluoroelastomer may be optionally added in the composition. The composition containing the cross-linking agent can be cross-linked by a conventional method. The cross-linking of the composition comprising the thermoplastic fluoroelastomer may be also effected by light or heat. In such a case, a light or heat sensitive compound is preferably added in the composition. Further, the cross-linking of the composition comprising the thermoplastic fluoroelastomer may be effected by radiation.

When the cross-linking is effected by the use of the organic peroxide compound or by radiation, the polyfunctional compound is described above is preferably added to the composition.

As the carbon fiber, any commercially available one may be used. Most of the commercially available carbon fibers contain greige goods, which tends to foam the composition. In the invention, the carbon fiber which does not contain the greige goods or from which it is removed is preferably used. The carbon fiber made from acrylonitrile is preferred. The carbon fiber has preferably a length of from 0.1 to 5 mm and a length/diameter ratio of at least 10. The amount of the carbon fiber to be compounded in the composition depends on the intended volume resistivity of the composition, the kind of fluoroelastomer, the kinds of the additives and/or the final use. Usually, when 1 to 300 parts by weight of the carbon fiber on the basis of 100 parts by weight of the fluoroelastomer is compounded, the volume resistivity of $10^{-1}$ to $10^{13}$ ohm.cm is achieved. Preferably, the amount of the carbon fiber is 5 to 150, more preferably 10 to 100, most preferably 20 to 50 parts by weight on the basis of 100 parts by weight of the fluoroelastomer.

In the composition of the present invention, the metal or its oxide (e.g. zinc white), the surface of which is treated to impart electric conductivity and/or the electrically conductive carbon black may be added. Such additives can improve the mechanical properties of the composition without deteriorating the electric conductivity of the composition. The amount of such other conductive additives is from 5 to 20 parts by weight on the basis of 100 parts by weight of the fluoroelastomer.

Further, in the composition of the present invention, any other additives such as carbon black, silica, talc, etc. which are added to conventional fluoroelastomer compositions, may be added.

The composition of the invention may be prepared by a per se conventional method, for example, by co-coagulating an aqueous dispersion comprising the fluoroelastomer and optionally the other electrically conductive additives and a co-coagulating agent such as a water-soluble electrolyte. Specific Examples of the co-coagulating agent are inorganic acids (eg. hydrochloric acid, sulfuric acid, etc.), organic acids (eg. acetic acid, oxalic acid, etc.), inorganic salts (eg. magnesium chloride, sodium chloride, ammonium chloride, aluminum sulfate, etc.), inorganic bases (eg. slaked lime, quick lime, etc.) and organic amines (eg. 1,8-diazabicyclo[5.4.0]undecene and its salts). When the fluoroelastomer is soluble in a solvent, the composition is also prepared by dissolving the fluoroelastomer in the solvent, adding the carbon fiber and other additives in the solution and removing the solvent. Specific examples of the solvent are acetone, methyl ethyl ketone, methyl isopropyl ketone, cyclohexane, tetrahydrofuran, dimethyl formaide, dimethyl acetamide, etc. Further, the composition may be prepared by kneading the components by means of mixing rolls, kneader or a Banbury mixer.

The composition of the invention is applied on a surface of a substrate in a form of a solution, a suspension or a powder coating composition by a conventional method, for example spray coating, brushing, dipping or powder coating. The solvent to be used for dissolving the composition of the invention may be the same as described above.

The composition of the invention is used as a shielding material, a electrically conductive coating, etc.

The present invention will be hereinafter explained further in detail by the following Examples, in which parts and % are by weight.

EXAMPLES 1 TO 5 AND COMPARATIVE EXAMPLES 1 TO 3

By using vinylidene fluoride/hexafluoropropene (molar ratio, 72:28) elastomeric copolymer, a composition having the formulation as shown in Table 1 was prepared.

The properties of the composition are shown in Table 2.

A test piece (150 mm×15 mm×2 mm) was molded from the composition and cross-linked under the conditions as shown in Table 2. The dry mechanical properties of the cross-linked test piece were measured according to the JIS.

The results are shown in Table 2.

TABLE I

| Formulation | Example | | | | | Comparative Example | | |
|---|---|---|---|---|---|---|---|---|
| (parts) | 1 | 2 | 3 | 4 | 5 | 1 | 2 | 3 |
| Fluoro-elastomer | 100 | 100 | 100 | 100 | 100 | 100 | 100 | 100 |
| Carbon fiber | 5 | 15 | 25 | 12.5 | 30 | — | — | — |
| CABOT #660*1 | — | — | — | 12.5 | — | 20*6 | 20*6 | 25 |
| Liquid elastomer*2 | — | — | — | 10 | 20 | — | — | 10 |
| Penhexine2-5B*3 | 1.5 | 1.5 | 1.5 | 1.5 | 1.5 | — | — | 1.5 |
| MgO | — | — | — | — | — | 15 | 3 | — |
| Ca(OH)$_2$ | — | — | — | — | — | 6 | 2 | — |
| Triallyl isocyanurate | 4 | 4 | 4 | 4 | 4 | — | — | 4 |
| V-3*4 | — | — | — | — | — | 3 | — | — |
| Bisphenol-AF | — | — | — | — | — | — | 1.0 | — |
| DBU-B*5 | — | — | — | — | — | — | 0.3 | — |

Note:
*1 Electrically conductive carbon black
*2 Vinylidene/hexafluoropropylene elastomeric copolymer (Mn = about 3,000)
*3 Peroxide manufactured by Nippon Yushi Kogyo Kabushikikaisha
*4 N,N'—dicinnamylidene-1,6-hexadiamine
*5 8-Benzyl-1,8-diazabicyclo[5.4.0]undecenium chloride
*6 Medium thermal carbon

COMPARATIVE EXAMPLE 4

100 parts of a thermoplastic fluoroelastomer comprising 88% of vinylidene fluoride/hexafluoropropylene/tetrafluoroethylene polymer segments (molar ratio, 50/30/20) and 12% of polyvinylidene fluoride polymer segments; 20 parts of electrically conductive carbon black (CABOT #660); 1.5 parts of Perhexa-2,5B (2,5-dimethyl-2,5-di(t-butyl-peroxy)hexane) and 4 parts of triallyl isocyanurate were successively added and kneaded on kneading rolls.

A sheet of the mixed compound (130 mm×150 mm×2 mm) was prepared by keeping the compound in a mold at 160° C. for 30 minutes. The sheet was slightly foamed.

COMPARATIVE EXAMPLE 5

In the same manner as in Comparative Example 4 but using 1.5 parts of Bisphenol-AF and 0.5 parts of 8-benzyl-1,8-diazabicyclo[5.4.0]undecenium chloride as a cross-linking system, 3 parts of magnesium oxide as an acid acceptor and 6 parts of calcium hydroxide, the thermoplastic fluoroelastomer composition was prepared. The composition was not cross-liked at 170° C.

EXAMPLE 6

In the same manner as in Comparative Example 4 but using 20 parts of carbon fiber in place of the electrically conductive carbon black, the thermoplastic fluoroelastomer composition was prepared. The carbon fiber was manufactured from acrilonitrile by Toho Rayon and washed with acetone to remove the greige goods. The composition was cross-linked in the same manner as in Comparative Example 4 to afford a cross-linked product. The cross-linked product was molded to a sheet (130 mm×150 mm×2 mm). Its volume resistivity was 5 ohm.cm.

EXAMPLE 7

In the same manner as in Example 6 but not using the peroxide compound and triallyl isocyanurate, the thermoplastic fluoroelastomer composition was prepared. The preparation time was only 15 minutes, and the amount of the heat build-up was in the same order as in the case of a conventional fluoroelastomer composition. Hardness (JIS A Hs) was 76.

TABLE 2

| | Example | | | | | Comparative Example | | |
|---|---|---|---|---|---|---|---|---|
| | 1 | 2 | 3 | 4 | 5 | 1 | 2 | 3 |
| ν min. (Kgf) | 0.07 | 0.11 | 0.15 | 0.13 | 0.06 | 0.12 | 0.17 | 0.25 |
| ν max. (Kgf) | 2.50 | 3.28 | 3.60 | 3.03 | 2.78 | 3.54 | 2.13 | 2.70 |
| ν (Kgf) | 2.43 | 3.17 | 3.45 | 2.90 | 2.72 | 3.32 | 1.96 | 2.45 |
| $T_{10}$ (min.) | 1.4 | 1.4 | 1.2 | 5.5 | 1.5 | 7.7 | 2.6 | 2.0 |
| $T_{90}$ (min.) | 4.3 | 4.5 | 3.6 | 27.0 | 5.3 | 22.0 | 5.8 | 5.5 |
| R (min) | 2.9 | 3.1 | 2.4 | 21.5 | 3.8 | 14.3 | 3.2 | 3.5 |
| Press curing | 160° C. × 20 min. | | | | | 170° C. × 20 min. | | |
| Oven curing | 180° C. × 4 hrs. | | | | | 180° C. × 4 hrs. | | 200° C. × 4 hrs. |
| $M_{100}$ (Kgf/cm$^2$) | 32 | 47 | 64 | 82 | 62 | 36 | 16 | 22 |
| $T_B$ (Kgf/cm$^2$) | 79 | 77 | 76 | 174 | 68 | 100 | 91 | 135 |
| $E_B$ (%) | 440 | 400 | 360 | 480 | 250 | 220 | 490 | 350 |
| Hardness (JIS, Hs) | 75 | 78 | 83 | 80 | 80 | 75 | 68 | 75 |
| Volume resistivity (at room temperature) (ohm.cm) | $10^{12}$ | $10^{12}$ | 5 | $10^5$–$10^8$ | 1 | $10^{13}$ | $10^{13}$ | $10^{13}$ |

The melt-molded sheet of 2 mm thick had 10 ohm.cm of volume resistivity.

EXAMPLE 8

In the same manner as in Example 6 using the thermoplastic fluoroelastomer but comprising tetrafluoroethylene/ethylene/hexafluoropropylene (molar ratio, 49/43/8) polymer segment in place of vinylidene fluoride polymer segment, the thermoplastic fluoroelastomer composition was prepared. The volume resistivity of the sheet of 2 mm thick prepared from the carbon-fiber containing composition was 1 ohm.cm.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A fluoroelastomer composition comprising a fluoroelastomer selected from at least one member of the group consisting of a cross-linkable fluoroelastomer and a thermoplastic fluoroelastomer and carbon fibers having a length of from 0.1 to 5.0 mm and a length/diameter ratio of at least 10, said carbon fiber being present in said composition in an amount of from 1 to 300 parts by weight on the basis of 100 parts by weight of the fluoroelastomer.

2. A composition according to claim 1, wherein the fluoroelastomer is a cross-linkable fluoroelastomer.

3. A composition according to claim 2, wherein said fluoroelastomer is selected from the group consisting of vinylidene fluoride/hexafluoropropylene copolymers, vinylidene fluoride/tetrafluoroethylene/hexafluoropropylene terpolymers, vinylidene fluoride/chlorotrifluoroethylene copolymers, tetrafluoroethylene/propylene copolymers, hexafluoropropylene/ethylene copolymers, perfluoroalkyl vinyl ether/olefin copolymers, fluorosilicone elastomers, fluorophosphazene elastomers.

4. A composition according to claim 2, which further comprises a liquid fluoroelastomer having a number average molecular weight of 500 to 20,000.

5. A composition according to claim 1, wherein said fluoroelastomer is a thermoplastic fluoroelastomer.

6. A composition according to claim 5, wherein said thermoplastic fluoroelastomer comprises a polymeric chain comprising at least one elastomeric polymer segment and at least one non-elastomeric polymer segment, at least one of these segments being a fluorine-containing polymer segment.

7. A composition according to claim 6, wherein the weight ratio of the elastomeric polymer segment and the non-elastomeric polymer segment is from 40:60 to 95:5.

8. A composition according to claim 5, wherein the thermoplastic fluoroelastomer comprises a polymeric chain comprising two or three polymer segments, at least one iodine atom liberated from an iodinated compound and bonded to a terminal carbon atom of the polymeric chain and a fragment of the iodinated compound excluding said liberated iodine atom therefrom;

one polymer segment (when the polymeric chain comprises two polymer segments) or one or two polymer segments (when the polymeric chain comprises three polymer segments) being elastomeric polymer segment(s) having a molecular weight of from 30,000 to 1,200,000 selected from the group consisting of (1) a vinylidene fluoride/hexafluoropropylene/tetrafluoroethylene a vinylidene fluoride/pentafluoropropylene/tetrafluoroethylene polymer in a molar ratio of 45–90:5–50:0–35 and (2) a perfluoro($C_1$–$C_3$-alkyl vinyl ether) (including those having plural ether linkages)/tetrafluoroethylene/vinylidene fluoride polymer in a molar ratio of 15–75:0–85:0–85, the other polymer segment(s) being a non-elastomeric polymer having a molecular weight of from 3,000 to 400,000 selected from the group consisting of (3) a vinylidene fluoride/tetrafluoroethylene polymer in a molar ratio of 0:100 to 100:0 and (4) a ethylene/tetrafluoroethylene/hexafluoropropylene, 3,3,3-trifluoropropylene-1,2-trifluoromethyl-3,3,3-trifluoropropylene-1 or perfluoro($C_1$–$C_3$-alkyl vinyl ether) (including those having plural ether linkages) polymer in a molar ratio of 40–60:60–40:0–30, the weight ratio of the elastomeric polymer segment and the non-elastomeric polymer segment being from 40:60 to 95:5.

9. A composition according to claim 1, wherein the amount of the carbon fiber is preferably 20 to 50 parts by weight on the basis of 100 parts by weight of the fluoroelastomer.

10. A composition according to claim 1, which further comprises an inorganic compound which is treated to impart electric conductivity and/or electrically conductive carbon black.

11. A composition according to claim 1, which is in solution form or a suspension in a solvent.

* * * * *